Aug. 23, 1966  R. THOMAS  3,268,708
APPARATUS FOR MOUNTING A TORCH ON A WELDING MACHINE
Filed Oct. 14, 1963  3 Sheets-Sheet 1
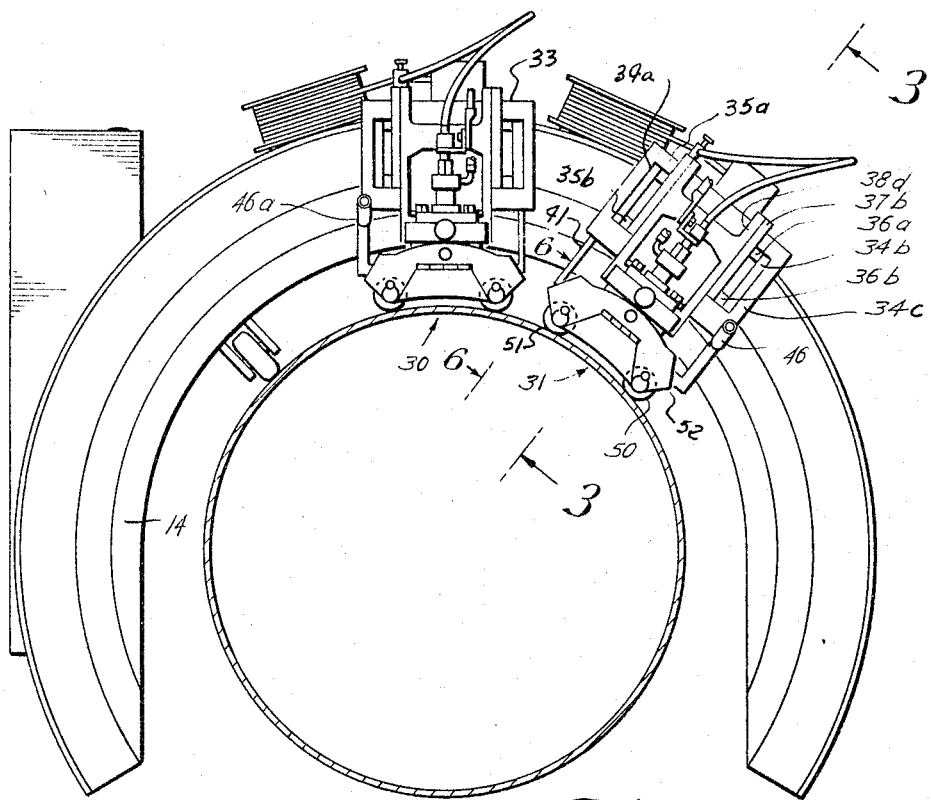
ROBERT THOMAS
INVENTOR.
BY
Browning, Simms, Hyer & Eichenroht
ATTORNEYS

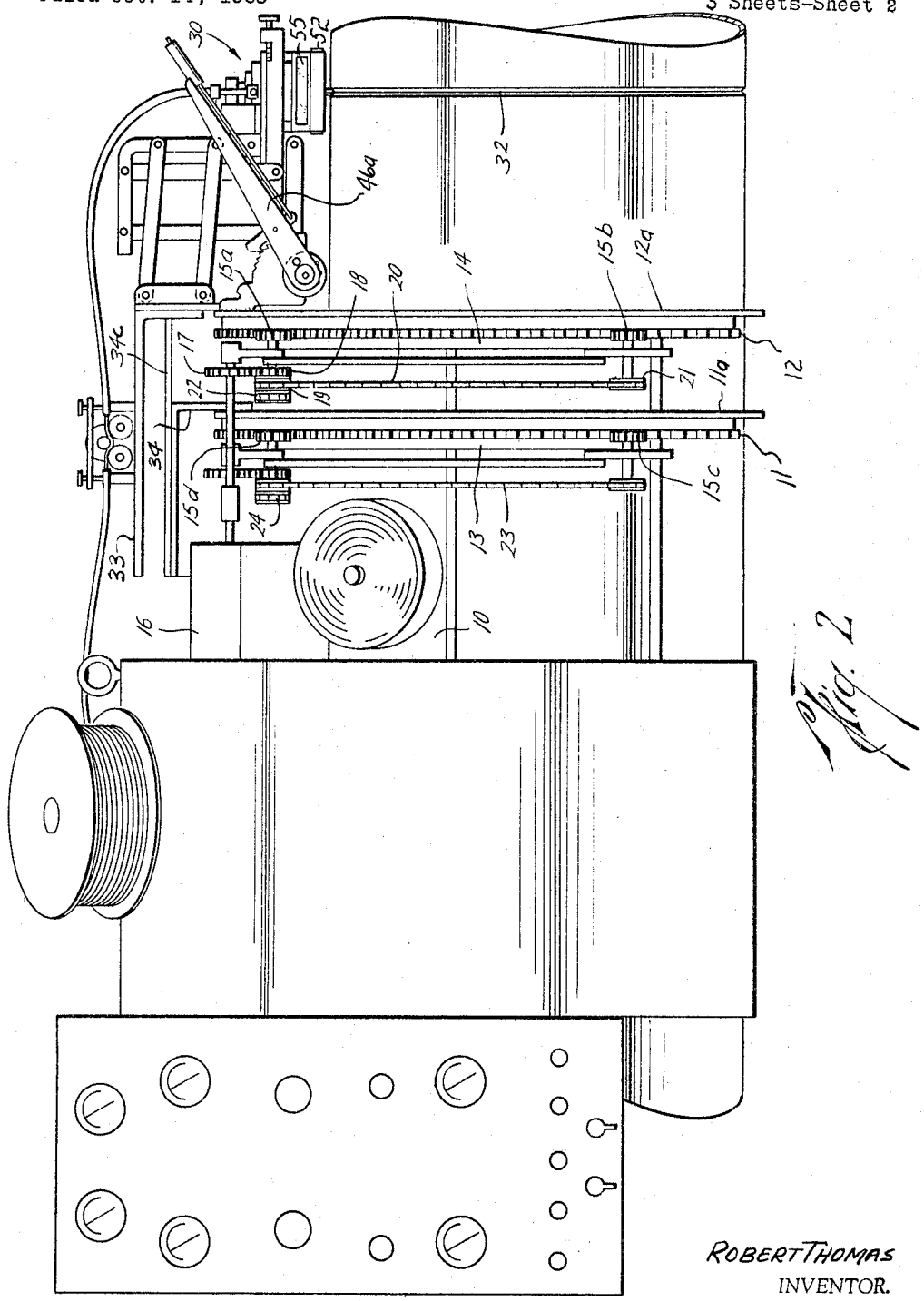

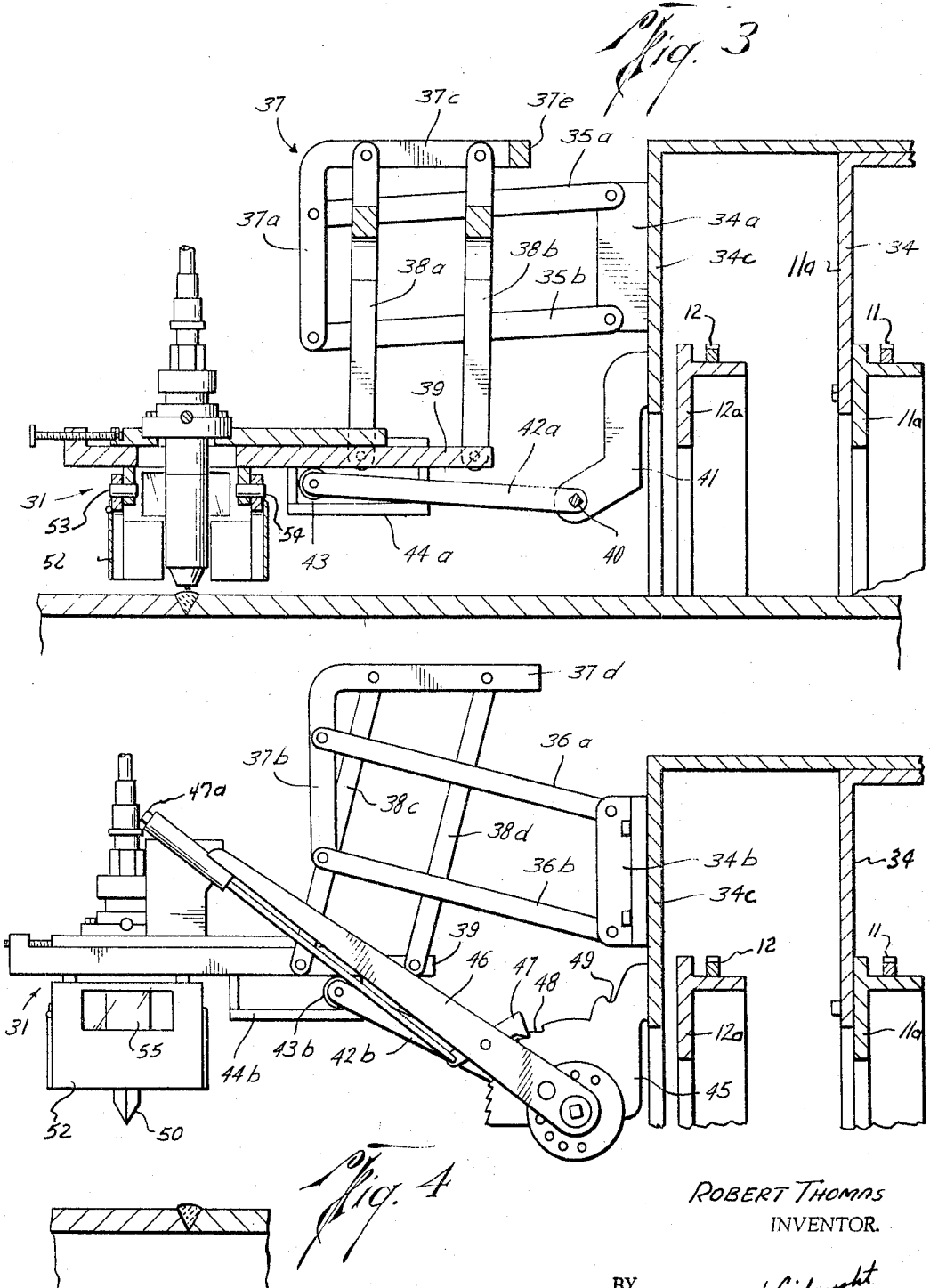

United States Patent Office 3,268,708
Patented August 23, 1966

3,268,708
APPARATUS FOR MOUNTING A TORCH ON A WELDING MACHINE
Robert Thomas, Houston, Tex., assignor to American Machine & Foundry Company, New York, N.Y., a corporation of New Jersey
Filed Oct. 14, 1963, Ser. No. 316,007
3 Claims. (Cl. 219—125)

This invention relates to a machine for automatically welding two pieces of metal together at a joint therebetween and more specifically to such a machine having an improved arrangement for mounting a welding torch thereon so that it can follow the joint to be welded.

While specific reference will be made herein to the butt welding of two pieces of pipe, it will be appreciated that this invention is applicable to the welding of metals of other configurations, such as plate, vessel bodies to vessel heads, etc. Further, "torch" as used herein is intended to include any movable heat source employed in fusion welding.

In welding machines of the type to which this invention pertains, the welding torch is moved along the joint to be welded by a torch moving mechanism which is mounted on one of the pieces to be welded. For example, in the welding of pipe, the torch moving mechanism is usually clamped adjacent one of the pipe ends and after the two ends of pipe have been aligned, it will move the torch around the joint between the two pipes. In such an arrangement, there has existed the problem of mounting the torch assembly to the torch mechanism in such a manner that the torch assembly will follow the joint to be welded despite minor variations in the position of the joint with respect to the fixed portion of the torch moving mechanism. For example, the pipe may be slightly out of round or the torch moving mechanism may not be clamped exactly parallel to the joint so that the torch, in order to follow the joint, must move toward and away from the moving mechanism. To produce a proper weld, the position of the torch between the two surfaces being welded together must be accurately controlled. Should the torch move vertically closer to or away from the joint or horizontally closer to one side of the joint than to the other, the ability of the torch to satisfactorily melt the base metal of the joint completely across the surfaces being welded will be reduced, resulting in zones of incomplete fusion in the weld.

Also, there has existed another problem of being able to quickly and properly move the torch into welding position after the welding machine has been fastened to one of the pipes, while at the same time permitting the torch to be moved away from the joint in an easy manner in order to inspect the same.

It is therefore an object of this invention to provide an automatic welding machine in which the torch is so mounted that it will properly follow the joint to be welded despite variations in the position of the joint from a desired normal position.

Another object of the invention is to provide such a machine in which the torch assembly is carried by a torch mounting mechanism which mechanism need not be precisely aligned with the joint, and yet the torch can properly follow the joint despite variations in alignment.

Another object of the invention is to provide such a machine in which the torch can be quickly moved into and out of welding position despite variations in the relative positions of the joint and the torch moving mechanism.

Another object of the invention is to provide such a machine having a welding torch which, when in a welding position, is held a fixed distance from the joint being welded by a suitable guide riding in the joint and which is urged resiliently to that position so that the torch can follow the contours of the joint while being moved by the torch moving mechanism.

Another object is to provide such a machine in which the torch assembly can be easily moved into and out of welding position by an arrangement which also serves to resiliently bias the torch toward the joint when it is in welding position.

Other objects, advantages, and features of the invention will be apparent to one skilled in the art upon the consideration of the specification, appended claims and attached drawings wherein:

FIG. 1 is an illustration of a welding machine for automatically welding a pipe joint, the machine being shown in end elevation with two torches in welding position;

FIG. 2 is a side view in elevation of the welding machine of FIG. 1 with a portion of its housing broken away to better illustrate the construction of the torch moving mechanism;

FIG. 3 is a view taken along line 3—3 of FIG. 1, showing a vertical cross section of an embodiment of the torch mounting mechanism of this invention, with the torch carried thereby in welding position;

FIG. 4 is a side view, in elevation, of the torch mounting mechanism of FIG. 3, showing the torch midway between the welding position of FIG. 3 and a fully retracted position;

FIG. 5 is a top view of the torch mounting mechanism of FIGS. 3 and 4; and

FIG. 6 is a view taken along line 6—6 showing the shape of the trailing guide roller used to keep the torch in alignment with the joint being welded.

The welding machine shown in FIGS. 1 and 2 includes a frame 10 which supports a pair of rotatable ring gear segments 11 and 12. More specifically, these segments are supported by ring gear guides 13 and 14 which are fixed to frame 10. The gear guides and the ring gears have conventional slide and guide connections between them permitting the ring gears to be moved, relative to the guides and the support around the longitudinal axis of the pipe while being held against axial displacement. It will be noted from FIG. 1 that the ring gears and their supports do not completely encircle the pipe but have a portion removed to provide a gap so that the entire apparatus can be lifted from and placed upon a pipe.

Suitable drive means can be provided for rotating and driving the ring gears and in this instance, this is shown (FIG. 2) as including spur gears 15 meshing with the ring gears. Spur gears 15a and 15b which drive ring gear 12 are driven by a suitable motor 16 which includes a speed reducer. More specifically, this motor drives a gear 17 which, in turn, drives another gear 18 fixed to the same shaft as gear 15a. On the same shaft is a suitable sprocket 19 connected to chain 20 which drives another sprocket 21 fixed to the same shaft as gear 15b. On the other side of ring gear 12 from the side view as in FIG. 2, are another pair of gears similar to 15a and 15b which are interconnected by a sprocket and chain drive to the drive motor 16 by a chain 22.

Spur gears 15c and 15d which drive ring gear segment 11 are likewise connected by a chain drive, including chain 23 which, in turn, is driven by sprocket 24 having a drive connection with another motor (not shown) similar to motor 16 but located on the side of the apparatus from that shown in FIG. 2. Ring gear segment 11 also has an additional pair of drive gears on the other side which are interconnected in the same way shown for ring gear segment 12.

It will thus be seen that each ring gear is independently driven by a drive motor through four drive gears so that each can be independently rotated. The ring gear arrangement and drive are similar to those which have been used for bevelling machines for bevelling the ends of pipe prior to welding. For further detail on this arrangement, reference is made to co-pending application, Serial No. 266,292, filed March 19, 1963, now Patent No. 3,207,881.

Attached to each ring gear segment are arcuate flanges 11a and 12a. A pair of torch assemblies 30 and 31 are respectively attached to the flanges through brackets 33 and 34 so that each can be rotated about the pipe to weld joint 32. Since these torch assemblies and the means by which they are mounted to the ring gear flanges are essentially the same, only one will be described in detail.

Referring now to FIGS. 3 to 5, there is shown a preferred form of this invention employing a double parallelogram connecting linkage for mounting the torch assembly 31 to bracket 34 which is connected to ring gear flange 11a. Bracket 34 includes an L-shaped extension member 34c which extends beyond ring gear flange 12a and is in alignment with bracket 33 to allow mounting linkages of the same length to be used. Attached to extension member 34c are brackets 34a and 34b to which, in turn, are pivotally attached two pairs of parallel arms 35a–35b and 36a–36b, respectively. The outer ends of these arms are attached to a link designated generally as 37. This link has two depending portions 37a and 37b to which the respective pairs of arms are pivoted. It also has portions 37c and 37d which extend rearwardly toward the torch moving mechanism to be joined together by cross portion 37e.

A second set of two pairs of arms are also provided. These arms comprise a first pair 38a and 38b and a second pair 38c and 38d. These pairs are pivoted to link portions 37c and 37d, respectively, and also to support 39 comprising a part of the torch assembly.

As will be seen from the drawings, the pivotal axis of all the pivotal connections of the arms are parallel to each other.

The torch assembly is thus supported on each side by two sets of parallelogram linkages connected in series with each other. The set of parallelogram linkages supporting the left-hand side, as viewed in FIG. 1, comprises the first parallelogram of parallel arms 35a and 35b, link portion 37a, together with bracket 34a and the second parallelogram of parallel arms 38a and 38b, link portion 37c, together with support 39 of the torch assembly. Supporting the right-hand side of the torch assembly is a similar set of two parallelograms in series comprising a first parallelogram consisting of parallel arms 36a and 36b, link portion 37b, together with bracket 34b and a second parallelogram consisting of parallel arms 38c and 38d, link portion 37d, together with support 39.

With this arrangement it can be seen that the torch assembly is free to move toward and away from the torch moving mechanism so as to provide one degree of freedom and is also free to move up and down as viewed in FIG. 3, so as to provide another degree of freedom. As a result, the torch is free to move in any direction in a plane normal to the pivot axis of the parallelogram linkage. Further, the torch can move in this plane without changing the angle its longitudinal axis makes with the surface of the pipe being welded.

In the embodiment shown in the drawings, the link portions used with each parallelogram is arranged so lines extending through the pivot points of each set of parallel arms will intersect at a 90° angle. This would not necessarily need be the case as these lines could intersect at an angle other than 90° and the same freedom of movement for the torch assembly obtained. However, these lines must intersect, i.e., they cannot be parallel or in line and obtain the desired result.

Also, in the drawings the torch assembly is shown supported on each side by sets of parallelogram linkages. This, generally, provides more stable support for the torch, however, only one such set of linkages can be used, if desired, and the same freedom of movement for the torch will be provided.

Means are provided for raising and lowering the torch into and out of its welding position and also for resiliently biasing the torch toward the joint to be welded when in the welding position. A preferred means is shown in the drawing as comprising a resilient torsion bar 40 rotatably supported near one end by a bracket 41, carried by bracket extension member 34c and having a non-rotative connection with arms 42a and 42b (FIG. 5). The other ends of arms 42a and 42b are each bifurcated to receive rollers 43a and 43b between them, which rollers lie respectively within guides in the form of frameworks 44a and 44b carried by the torch assembly.

The torsion bar is rotatably supported near its other end by bracket 45, which is also carried by the bracket extension member 34c. A lever arm 46 is attached to the bar for rotating it in brackets 41 and 45 to cause arms 42a and 42b to move rollers 43a and 43b either up or down and thereby move torch assembly 31 up or down. The torch assembly is, of course, free to move up and down relative to bracket 34 due to the mounting means of this invention as explained above.

A push button type of pawl 47 is carried by the lever to engage ratchet teeth 48 on bracket 45. A holding tooth 49 is also provided on bracket 45 so that when the lever moves the torch assembly to its uppermost position, the pawl can engage this tooth and hold the assembly in a fully retracted position. However, when it is desired to bring the torch into welding position, the pawl is disengaged by push button 47a and the hand lever 46 pulled down until the torch assembly is riding on the pipe, after which the hand lever can be pulled an additional distance to twist torsion bar 40 between the lever and arms 42 to provide the desired resilient force for pushing the torch assembly against the pipe.

The torch assembly is provided with two rollers 50 and 51 which are forced into engagement with the joint being welded by the resilient force of the bar. In torch assembly 31, which moves clockwise around the joint as viewed in FIG. 1, roller 50 precedes the weld whereas roller 51 moves over the welded joint. Thus, roller 50 is provided with a convex peripheral surface (FIG. 4) designed to engage the surface of the joint before it is filled with weld metal, whereas roller 51 is provided with a concave peripheral surface (FIG. 6) to engage the surface of the completed weld. Thus the rollers not only space the torch assembly the proper distance from the joint during the welding operation but they also guide the torch along the joint. Thus, by using rollers of this type in combination with the torch mounting means of this invention, the torch will automatically follow the changing contours of the joint.

The position of the rollers for torch assembly 30 would, of course, be reversed since it travels in a counter-clockwise direction around the joint as viewed in FIG. 1. At the point where the welds produced by the torch assemblies join, the leading roller with the convex surface will have to move over a short section of the weld produced by the other torch. This changes the spacing of the electrode from the joint slightly, however, since the effect of its upward movement is cut in half by the use of two rollers, the change in spacing is not such as will prevent a satisfactory weld from being obtained at the joint.

The rollers are rotatably mounted in a housing 52 which encircles the torch and extends downwardly toward the joint being welded to substantially enclose the torch. The housing is pivotally connected to the torch assembly by pins 53 and 54 to allow the housing to pivot around an axis transverse of the joint being welded as required to allow the rollers to remain in engagement with the joint.

Housing 52 also serves to provide a chamber which can be supplied with an inert gas to maintain a non-oxidizing atmosphere around the torch. A window 55 of transparent material is placed in the wall of the housing to allow the operator of the machine to observe the welding operation.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a welding machine wherein a welding torch assembly is moved along a joint to be welded by a torch moving mechanism, the improvement which comprises in combination therewith:
    (A) a connecting linkage which includes a first pair of parallel arms pivotally connected at one of their ends to the torch moving mechanism;
    (B) a link pivotally connected to the other ends of said first arms to form together with the first arms a first parallelogram linkage;
    (C) a second pair of parallel arms pivotally connected at one of their ends to said link and at their other ends to said torch assembly to form a second parallelogram linkage, all of the pivotal axes of the pivotal connections of said first and second arms being parallel to each other and positioned such that a line drawn through the pivotal axes of the first arms connections to said link lies at an angle to a line drawn through the pivotal axes of the second arms connections to said link whereby the torch assembly is provided with two degrees of freedom in a single plane transverse to said pivotal axes;
    (D) resilient means urging the torch assembly toward the joint to be welded, said resilient means including:
        (a) a torsion rod rotatably mounted on the torch moving mechanism;
        (b) a force transmitting connection between the torsion rod and the torch assembly and connecting linkage; and
        (c) means for rotating the torsion rod and applying torsion thereto.

2. The machine of claim 1 wherein the torch assembly includes a guide adapted to track the joint and to move the torch assembly laterally of the torch moving mechanism in order to keep the torch in alignment with the joint.

3. In a welding machine wherein a welding torch assembly is moved along a joint to be welded by a torch moving mechanism, the improvement which comprises in combination therewith:
    (A) a connecting linkage including first and second pairs of parallel arms pivotally connected respectively to said torch moving mechanism and to said torch assembly and also pivotally connected to a link member, with the pivotal connection to the link member of the first pair of parallel arms being on a line which makes a right angle with a line through the pivotal connections of the second pair of parallel arms to the link member to form effectively two parallelogram linkages in series with each other, whereby the torch assembly is provided with two degrees of freedom of movement in a plane transverse to said pivotal axes; and
    (B) resilient means urging the torch assembly toward the joint to be welded, said resilient means including:
        (a) a torsion rod rotatably mounted on the torch assembly and torch moving mechanism;
        (b) a force transmitting connection between the torsion rod and the connecting linkage and the torch assembly; and
        (c) means for rotating the torsion rod and applying torsion thereto.

References Cited by the Examiner

UNITED STATES PATENTS

| | | | |
|---|---|---|---|
| 2,090,439 | 8/1937 | Carwardine | 248—325 X |
| 2,500,815 | 3/1950 | Gerli et al. | |
| 2,700,524 | 1/1955 | Lauterbach | 248—281 X |
| 2,802,931 | 8/1957 | Hess | 219—124 X |
| 2,964,607 | 12/1960 | Frumkin | 219—8.5 |
| 3,207,881 | 9/1965 | Pagan | 219—60 |

RICHARD M. WOOD, *Primary Examiner.*

J. V. TRUHE, *Assistant Examiner.*